United States Patent
Schuckle et al.

(10) Patent No.: US 7,017,054 B2
(45) Date of Patent: Mar. 21, 2006

(54) MIRRORED TAG SNOOP OPTIMIZATION

(75) Inventors: Richard W. Schuckle, Austin, TX (US); Gary Verdun, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 489 days.

(21) Appl. No.: 10/188,595

(22) Filed: Jul. 2, 2002

(65) Prior Publication Data

US 2004/0006716 A1    Jan. 8, 2004

(51) Int. Cl.
  *G06F 1/32*    (2006.01)
(52) U.S. Cl. .................... 713/300; 713/320; 713/323
(58) Field of Classification Search ............... 713/300, 713/320, 323
  See application file for complete search history.

(56) References Cited

U.S. PATENT DOCUMENTS

| | | | |
|---|---|---|---|
| 4,439,829 A * | 3/1984 | Tsiang | 711/118 |
| 5,228,135 A | 7/1993 | Ikumi | 395/425 |
| 5,623,633 A | 4/1997 | Zeller et al. | 395/473 |
| 5,737,757 A * | 4/1998 | Hassoun et al. | 711/145 |
| 5,809,537 A | 9/1998 | Itskin et al. | 711/146 |
| 5,933,844 A * | 8/1999 | Young | 711/3 |
| 5,991,833 A | 11/1999 | Wandler et al. | 710/52 |
| 6,085,330 A | 7/2000 | Hewitt et al. | 713/322 |
| 6,378,076 B1 * | 4/2002 | Qureshi | 713/322 |
| 6,865,646 B1 * | 3/2005 | David | 711/128 |

* cited by examiner

*Primary Examiner*—Thomas Lee
*Assistant Examiner*—Vincent Tran
(74) *Attorney, Agent, or Firm*—Baker Botts L.L.P.

(57) ABSTRACT

A method and system for reducing snoop traffic on a processor bus coupling a cache memory and a processor. The processor is unable to perform a snoop operation while operating in a lower power state to conserve power. A copy of cache tag is maintained in a memory controller coupled to the processor bus. The memory controller performs snoop operations on the copy of the cache tag while the processor is placed in the lower power state. The processor exits the lower power state when an access to a modified cached line occurs.

17 Claims, 4 Drawing Sheets

MIRRORED TAG SNOOP OPTIMIZATION

BACKGROUND OF THE INVENTION

1. Field of the Invention

The present invention relates to cache based computer systems. More specifically, the present invention relates to optimizing snoop operations that enable a reduction in power consumed by a cache based computer system.

2. Description of the Related Art

Information systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

A computer system, which is one common type of information handling system, may be designed to give independent computing power to one or a plurality of users. Computer systems may be found in many forms including, for example, mainframes, minicomputers, workstations, servers, clients, personal computers, Internet terminals, notebooks, personal digital assistants, and embedded systems.

A computer system may be available as a desktop, floor-standing unit, or as a portable unit. The computer system typically includes a microcomputer unit having a processor, volatile and/or non-volatile memory, a display monitor, a keyboard, one or more floppy diskette drives, a hard disc storage device, an optional optical drive, e.g., DVD, CD-R, CD-RW, Combination DVD/CD-RW or CD-ROM, and an optional printer. A computer system also includes an operating system, such as Microsoft Windows XP™ or Linux. A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These I/O devices are typically plugged into connectors of computer system I/O interfaces such as serial interfaces and parallel interfaces, for example. Generally, these computer systems use a system board or motherboard to electrically interconnect these devices.

Computer systems also typically include basic input/output system ("BIOS") programs to ease programmer/user interaction with the computer system devices. More specifically, BIOS provides a software interface between the system hardware and the operating system/application program. The operating system ("OS") and application program may typically access BIOS rather than directly manipulating I/O ports, registers, and control words of the specific system hardware. Well known device drivers and interrupt handlers access BIOS, for example, to facilitate I/O data transfer between peripheral devices and the OS, application program, and data storage elements. BIOS is accessed through an interface of software interrupts and contains a plurality of entry points corresponding respectively to the different interrupts. In operation, BIOS is typically loaded from a BIOS ROM or BIOS EPROM, where it is nonvolatily stored, to main memory from which it is executed. This practice is referred to as "shadowing" or "shadow RAM" and increases the speed at which BIOS executes.

Although the processor provides the "brains" of the computer system, I/O communication between an I/O device and the processor forms a basic feature of computer systems. Many I/O devices include specialized hardware working in conjunction with OS specific device drivers and BIOS routines to perform functions such as information transfer between the processor and external devices, such as modems and printers, coupled to I/O devices.

Cache memory subsystems are prevalent within modern-day computer systems and are well known. For example, cache memory subsystems are described in U.S. Pat. No. 5,623,633 to Zellar, et al. and U.S. Pat. No. 5,809,537 to Itskin, et al. A cache is typically a small, higher speed, higher performance memory system which stores the most recently used instructions or data from a larger but slower memory system. Programs frequently use a subset of instructions or data repeatedly. As a result, the cache is a cost effective method of enhancing the memory system in a 'statistical' method, without having to resort to the expense of making the entire memory system faster.

For example, when the processor performs a read (fetch) operation, the processor will first check to see if the data requested by the processor is in the cache. If the data requested by the processor is in the cache, then the cache provides the data quickly to the processor, without having to access the relatively slower main memory (e.g., typically DRAM or ROM). If the data is not in the cache, the processor fetches the data needed from DRAM or ROM, and also stores a copy in the cache (assuming the 'page' of the address has been marked as 'cacheable' by system software). Now this data is available in the cache if the processor requests the data again. The larger the cache, the more data the cache can store, and the more likely it is for the requested item to be in the cache.

An $N^{th}$ level cache is typically N−1 levels away from the processor. A higher level cache generally includes a higher latency period compared to the latency period associated with a lower level cache.

Power management subsystems are known within modern-day computer systems. Exemplary power management subsystems are described in, for example, U.S. Pat. No. 6,085,330 to Hewitt, et al.

The following are hereby incorporated by reference: U.S. Pat. No. 5,623,633 to Zellar, et al., U.S. Pat. No. 5,809,537 to Itskin, et al., and U.S. Pat. No. 6,085,330 to Hewitt, et al.

SUMMARY OF THE INVENTION

It has been discovered that a method and system may be used for reducing snoop traffic on a processor bus, coupling a cache memory and a processor is described. The method and system thereof redirects the snoop traffic to a memory controller thereby enabling the processor to be in a lower power state. Such a method and system thereof allow conservation of power. Consequently, the operational run-time of computer systems, especially of portable computer systems, is advantageously extended over a longer period of time.

In one embodiment, a method and system includes a processor bus coupling a cache memory and a processor. The processor is unable to perform a snoop operation while in a lower power state to conserve power. A copy of cache tag is maintained in a memory controller coupled to the processor bus. The memory controller performs snoop operations on the copy of the cache tag while the processor is advantageously placed in the lower power state to conserve power. The processor exits the lower power state when an access to a modified cached line occurs. The processor continues to operate in the lower power state when an access does not reside in the cache or the access is to an unmodified cached line.

In one embodiment, a method of reducing power consumed by a processor in an information handling system having the processor coupled to a memory controller includes providing the processor to be placed in a lower power state and in a higher power state. The processor consumes lower power while in the lower power state when compared to the higher power state. The processor is unable to perform a snoop operation while in the lower power state to conserve power. The method further includes performing the snoop operation with the memory controller. The processor is advantageously maintained in the lower power state to conserve power while the memory controller performs the snoop operation.

In one embodiment, a computer system to implement a method of reducing power consumed by the computer system includes a processor, a memory, a memory controller and a cache memory all of which are coupled to each. The processor is unable to perform a snoop operation while in the lower power state. The memory controller advantageously is enabled to perform the snoop operation. In one embodiment, the memory controller performs the snoop operation by re-directing the snoop operation from the processor to memory controller so that the processor is enabled to continue to be in a lower power state. The memory controller determines whether an address of a memory location accessed has a match in the mirror tag.

In one embodiment, a computer system to implement a method of reducing power consumed by the computer system includes a processor, a memory, a memory controller and a cache memory all of which are coupled to each. The memory controller is enabled to store a copy of cache tag in the memory controller. The memory controller performs the snoop operation on the copy of the cache tag while the processor is unable to perform a snoop operation, the processor being in the lower power state to conserve power. The processor is enabled to exit the lower power state when an access to a modified cache line occurs.

In one embodiment, a computer-readable medium includes a computer program accessible therefrom. The computer program includes instructions for maintaining a processor of an information handling system in a lower power state. The processor is unable to perform a snoop operation while operating in the lower power state. The snoop operation is redirected from the processor to a memory controller of the information handling system. The redirected snoop operation advantageously enables a reduction in power consumed since the processor is maintained in the lower power state.

In one embodiment, a computer-readable medium includes a computer program accessible therefrom. The computer program includes instructions for maintaining a copy of cache tag in a memory controller of an information handling system. The memory controller is coupled to a processor included in the computer system. The computer program performs a snoop operation with the memory controller on the copy of the cache tag while the processor is placed in a lower power state. The processor is unable to perform a snoop operation while operating in the lower power state. The processor exits the lower power state when an access to a modified cached line occurs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The following description of the invention is intended to be illustrative only and not limiting.

Figure 1:
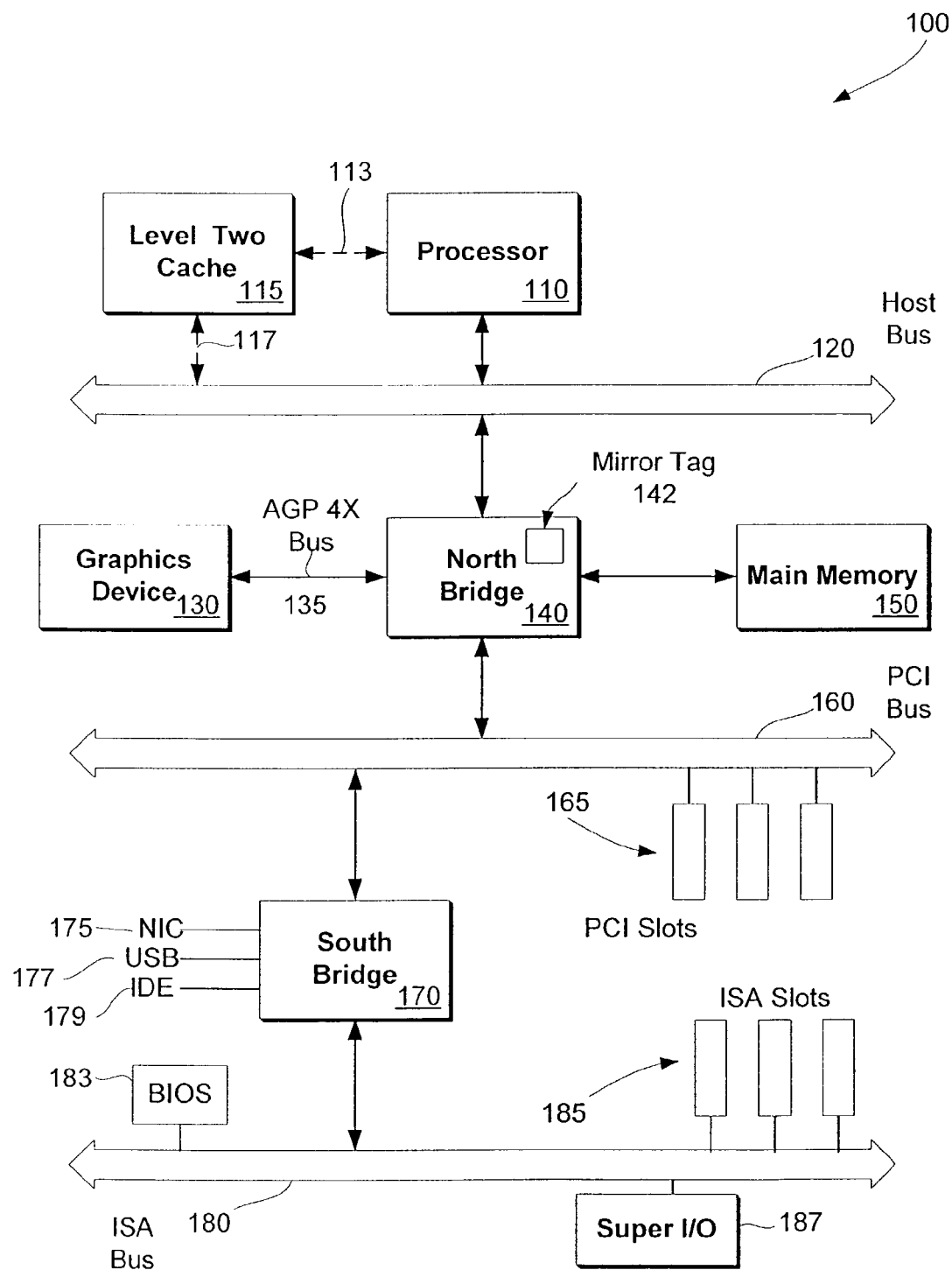
FIG. 1 illustrates a cache based computer system to implement a method of reducing snoop traffic to reduce the power consumed.

Referring to FIG. 1, an information handling system 100 is shown that is suitable for implementing a method of reducing snoop traffic. In one embodiment, information handling system 100 is a computer system.

Information handling system 100 includes a processor 110, which may also be referred to as a CPU. Typical examples of processors included in information handling system 100 are an Intel Pentium™ class microprocessor or an AMD Athlon™ class microprocessor. The processor may include one or more processors. Processor 110 is coupled to the host bus 120. The host bus 120 is typically a high-speed bus. In one embodiment, information handling system 100 may include more than one processor coupled to the host bus 120. A level one or level two (L2) cache memory 115 is coupled to processor 110.

A north bridge 140, which may also be referred to as a "memory controller hub" or a "memory controller", is coupled to main system memory 150. The north bridge 140 connects with the system processor 110 via the host bus 120. The north bridge 140 is generally considered an application specific chip set that provides connectivity to various buses, and integrates other system functions such as memory interface. For example, an Intel 820E and/or 815E chip set available from Intel provides at least a portion of the north bridge 140 functionality described below. The chip set may also be packaged as an application specific integrated circuit ("ASIC"). The north bridge 140 typically includes functionality to couple the main system memory 150 to other devices within information handling system 100. Thus memory controller functions such as main memory control functions typically reside in the north bridge 140. Main memory 150 includes a memory area, which is employed to store data and logic to implement various embodiments of a method of reducing snoop traffic as will be discussed in more detail subsequently. In addition the north bridge provides bus control to handle transfers between the host bus 120 and a second bus, e.g., a PCI bus 160. The second bus may also include other industry standard buses or proprietary buses. Thus the north bridge couples processor 110, L2 cache 115, graphics device 130 (e.g., via AGP bus 135), main memory 150, and host bus 120 to all PCI bus 160 connected devices.

In one embodiment, the method of reducing snoop traffic is implemented in the north bridge 140 by maintaining a mirror tag 142, which is a mirror image of the cache tag while processor 110 is in the low powered state. In another embodiment, the method of reducing snoop traffic is implemented in the cache controller (not shown).

A device generates a power event in information handling system 100. Power events are typically generated by various devices that support a power interface such as an Advanced Configuration and Power Interface ("ACPI"). The devices, for example, may include processor 110, and a controller, e.g., graphics controller included in graphics device 130. Power events include fixed ACPI events and general-purpose events. Examples of fixed ACPI events include actuation of a power button, actuation of a sleep button, and raising of a global release status. Examples of general-purpose events include wake events, a dispatching event for servicing an ACPI-aware device driver, and a queuing event for determining a control method to queue for execution. Advanced Configuration and Power Interface events are typically signaled by asserting a system control interrupt (SCI) signal.

The Advanced Configuration and Power Interface (ACPI) specification, Revision 2.0, Jul. 27, 2000, is published by Compaq Computer Corporation, Intel Corporation, Microsoft Corporation, Phoenix Technologies Ltd., and Toshiba Corporation. The ACPI specification typically defines four processor power states C0, C1, C2 and C3. The C0 through C3 power states defined in the ACPI specification get mapped to certain processor power states as defined by the manufacturer of processor 110. For example, Intel provides support for halt, stop grant, stop clock, etc. commands or instructions and are specific to the Intel processors. Similarly, AMD may have different names for the power states C0–C3 they implement for AMD processors, and AMD power state mappings may also be different compared to Intel.

In one embodiment, processor 110 may support more power states than the C0–C3 defined in ACPI. All processor implementations typically specify that the lowest achievable power states require that the cache snoop logic not be functional, e.g., processor is unable to perform snooping operation while in lower power state. This typically implies that Master accesses to system memory will cause the processor to "wake" to a higher power state in order to snoop the memory access. In one embodiment, processor 110 supports the following processor power states (the equivalent C0–C3 ACPI power state mapping is included in the parenthesis):

1) Normal State (ACPI C0 State)—The Normal state of the processor is the normal operating mode where the processor's core clock is running and the processor is actively executing instructions.
2) Quick Start State (Typically mapped to C1 in ACPI)—In the Quick Start state the processor is typically capable of acting on snoop transactions generated by the system bus priority device. Because of its snooping behavior, Quick Start may be typically used in a uni-processor (UP) configuration.
3) Sleep State (typically mapped to C2 state in ACPI)—The Sleep state is a lower-power state in which the processor maintains its context and the phase-locked loop (PLL) maintains phase lock. While in the Sleep state the processor is generally incapable of snooping or latching any events.

While in the Sleep state, the processor may enter an even lower power state, the Deep Sleep state. Removing the processor's input clock generally puts the processor in the Deep Sleep state.
4) Deep Sleep State (Typically mapped to C3 state in ACPI)—The Deep Sleep state is another lower power state the processor may enter while maintaining its context. Depending on the chipset manufacturer, additional lower power states when compared to the Deep Sleep state may be supported. The Deep Sleep state typically consumes less power compared to the Sleep state. While in this state the processor is limited in its ability to respond to input. It is generally incapable of servicing snoop transactions.

The Advanced Configuration and Power Interface generally specifies that processor 110 is to consume less power in state C3 than in state C2, that the processor is to consume less power in state C2 than in state C1, and that the processor is to consume less power in state C1 than in state C0. The C0 state is a fully-operational state in which processor 110 is supported by a full-power expenditure. In a typical system, the processor power consumption in the C2 state is about 10% of the power consumption in the C0 state. The power consumption in the C3 state is about one to two percent of the power consumption of C0 state. Thus C3 is described as a lower power state in comparison C2 or C1 or C0. Similarly, C2 is described to be a lower power state compared to C1 or C0, and C1 is a lower power state when compared to C0. Power consumption differences of these magnitudes are typically important in portable systems that have an operational runtime that depends on the conservation of battery power.

In general, the lower the power level or state of processor 110, the longer it takes for processor 110 to wake up, e.g., to resume full performance. For example, a processor 110 may typically take 20 to 30 clock cycles to transition from C1 to C0 whereas a transition from C3 to C0 may take several hundred clock cycles. Many Advanced Configuration and Power Interface implementations typically toggle processor states between C0 and C1.

During the operation of a information handling system 100, when a system bus, e.g., PCI bus 160, cycle transfers a request for access of system memory, a snoop of the processor cache 115 is typically necessary for several reasons. The snoop prevents the cycle from accessing invalid data, data that is only valid in the cache. The snoop also prevents cache data from being 'old' 'obsolete' or 'dirty' due to the fact that the contents of system memory has been updated by the PCI cycle.

The C1 state is defined as a 'snoopable' state so that, for an access to system memory, monitoring is allowed to determine whether the data targeted by the access is in-fact within the processor cache. Knowledge of which pieces of information reside in the processor caches 115 and system memories is important to ensure that only valid data, and not data which is obsolete, is accessed. All information is typically valid with respect to processor 110. However, within information handling system 100 the memory and caches may be accessed via various devices and buses that bypass processor 110. For example, a device on a PCI bus 160 may attempt to access system memory without determining whether updated versions of the data reside in an internal processor cache. Eventually, some data corresponding to information that has been changed in processor cache 115 may be accessed by the device so that incorrect data is obtained. Processor 110 monitors, e.g., snoops, the memory transaction as it occurs. Processor 110 compares the memory address to an index of the addresses of memory locations that are stored in the processor's cache RAM. The index list is stored in the tag RAM.

While in the C2 or C3 state, the processor's caches maintain state but are unable to perform typically ignore any snoops. The system hardware and/or software implementation is typically responsible for ensuring that the caches maintain coherency.

The requirement is that when the cache resides inside the processor (this is standard practice in many processors), then the processor must be in a power state that supports "snooping" of memory accesses when they occur. For the "typical" mobile implementation of an Intel processor this would be ACPI state "C0 or C1" as described above. When the processor is in a non-cacheable state, e.g., "C2 or C3", hardware in the system detects a request from a bus master device and "wakes" the processor when the bus is granted to the master in case the cycle is a memory access to a cached memory area.

Processor 110 consumes more power when in the "snoopable" power state. The primary savings is the power that the processor would consume while not in the lower power state (e.g., C3 state). In one embodiment, processor 110 is enabled to stay in a lower power state by implementing the mirror tag method of reducing snoop traffic in the north bridge 140, as described in further detail below. A mirror tag 142 included in the north bridge 140 is advantageously used for performing the snoop operation. In one embodiment, the snoop operation is redirected from processor 110 to the north bridge 140, thereby enabling processor 110 to continue to operate in a lower power state.

The north bridge 140 is coupled to the graphics device 130 via a high speed graphics bus, e.g., AGP 4X bus 135. The graphics device 130 typically includes a graphics controller (not shown) coupled to a panel display screen (not shown). For portable information handling systems, the graphics controller may also be coupled to an optional external display device (not shown). In one embodiment, the graphics device 130 also includes a video memory (not shown) which stores information to be displayed on panel display. For portable information handling systems, the panel display is typically an active matrix or passive matrix liquid crystal display ("LCD") although other display technologies may be used as well.

The PCI bus 160 typically provides an interface for a variety of devices coupled through PCI slots 165. A south bridge (also referred to as an I/O controller hub) 170 provides bus control to handle transfers between the second bus, e.g., the PCI bus 160 and a third bus, e.g., an ISA bus 180. PC I/O subsystems that are typically connected to a south bridge 170 include: integrated drive electronics 179 ("IDE") hard drive, universal serial bus 177 ("USB"), personal computer memory card international association ("PCMCIA") devices, Ethernet local area network, audio input/output cards, and modem/DSL cards.

The south bridge 170 may also include other functional elements (not shown), such as power management functionality, a real-time clock (RTC), DMA control, interrupt support, and system management bus support. PC peripheral devices and input/output (I/O) devices (e.g., IrDA devices, floppy disk drives, serial port devices, parallel port devices) can be attached to various interfaces such as via ISA slots 185 coupled to ISA bus 180. Alternatively, many types of I/O devices can be accommodated by a super I/O controller 187 coupled to ISA bus 180.

A Basic Input Output System ("BIOS") device 183 is coupled to ISA bus 180 and it incorporates the necessary processor executable code for a variety of low-level system functions and system boot functions. A FLASH memory or other nonvolatile memory is used as BIOS memory (not shown). A BIOS program (not shown) is usually stored in the BIOS memory. The BIOS program includes software for interaction with the information handling system boot devices such as the keyboard, the mouse, or a USB 177 controller. The BIOS device 183 stores the system code which controls some information handling system 100 operations.

For portable information handling systems, a PCMCIA controller (not shown) is typically coupled to at least one expansion slot to receive PCMCIA expansion cards such as modems, fax cards, communications cards, and other input/output devices.

A network interface controller ("NIC") 175 enables information handling system 100 to communicate with a computer network such as an Ethernet. The computer network may include a network such as a local area network ("LAN"), wide area network ("WAN"), Internet, intranet, wireless broadband or the like. The network interface controller 175 forms a network interface for communicating with other computer systems (not shown) connected to the Ethernet. The computer system's networking components generally include hardware as well as software components. Examples of the hardware components include the network interface controller 175 and the Ethernet. Examples of the software components, which include messaging services and network administration services, are described below.

Information handling system 100 serves as a controller for resolving proprietary and standard event and message structures into a common format for use by the computer network for many management purposes. Information handling system 100 is connected with a plurality of computer systems in the network for receiving messages from the computer systems, analyzing the messages and determine an effective utilization of the messages as directed by a user or network administrator. Information handling system 100 receives messages in different message formats, organizes the messages, and converts the messages into a common format that assists a user, system administrator, or network administrator in utilizing the information contained in the messages. Information handling system 100 supports the conversion of messages into the common format to facilitate particular network applications.

Information handling system 100 includes a power supply (not shown), for example, a battery, which provides power to the many devices which form information handling system 100. Power supply is typically a rechargeable battery, such as a nickel metal hydride ("NiMH") or lithium ion battery, when information handling system 100 is embodied as a portable or notebook computer. Power supply is typically coupled to a power management microcontroller (not shown) which controls the distribution of power from power supply. Microcontroller is generally coupled to a main power switch, which the user actuates to turn information handling system 100 on and off.

In a portable embodiment, information handling system 100 also includes a screen lid switch (not shown) or indicator which provides an indication of when panel display is in the open position and an indication of when panel display is in the closed position. It is noted that panel display is generally located in the same location in the lid of information handling system 100 as is typical for 'clamshell' type portable laptop or notebook computers. In this manner, the display screen forms an integral part of the lid of the computer that swings from an open position for interaction with the user to a closed position.

When information handling system 100 is turned on or powered up, information handling system 100 enters a start up phase, also referred to as a boot up phase, during which the information handling system hardware is detected and the operating system is loaded. During the initial boot stages, the information handling system BIOS software stored in non-volatile memory is copied into main memory 150 so that it can be executed more quickly. This technique is referred to as "shadowing" or "shadow RAM" as discussed above.

In one embodiment, information handling system 100 includes a computer-readable medium having a computer program or information handling system 100 software accessible therefrom, the computer program including instructions for performing the method of reducing snoop traffic for each information handling system that is connected to a network of information handling systems. The computer-readable medium may typically include any of the following: a magnetic storage medium, including disk and tape storage medium; an optical storage medium, including compact disks such as CD-ROM, CD-RW, and DVD; a non-volatile memory storage medium; a volatile memory storage medium; and data transmission or communications medium including packets of electronic data, and electromagnetic or fiber optic waves modulated in accordance with the instructions.

Figure 2:
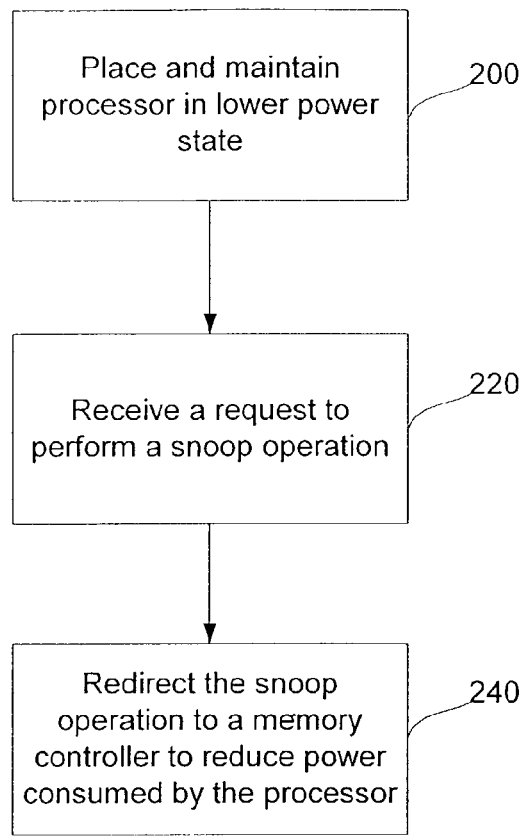
FIG. 2 illustrates a flow chart for a method of reducing power consumed by the processor.

Referring to FIG. 2, a flow chart for a method of reducing power consumed by processor 110 is illustrated. In step 200, processor 110 is placed in a lower power state by a variety of methods. For example, by idling processor 110 or by asserting a STP_CLK# signal. After initially placing processor 110 in a lower power state, the lower power state is maintained, for example by continuing to idle processor 110.

In step 220, a request is received to perform a snoop operation. In one embodiment, a request for performing a snoop operation may be automatically triggered when a controller device such as an IDE controller performs a read and/or write access to the main system memory 150 directly by by-passing processor 110. Typically, processor 110 is configured to receive the request and perform snoop operations when processor 110 is in C0, or C1 power states as described in the Advanced Configuration and Power Interface specification.

In step 240, in one embodiment, the request to perform a snoop operation is redirected to the memory controller 140 rather than processor 110. Thus processor 110 is advantageously enabled to remain in a lower power state by redirecting the snooping operation. In other embodiments, any of information handling system 100 devices such as the south bridge 170, graphics device 130 or other controllers may be assigned the function of performing the snooping operation. By redirecting the snoop operation to other device or devices, processor 110 is enabled to stay in a lower power state for a longer period of time, thereby reducing the power consumption.

In one embodiment, the power consumed by processor 110 is reduced by reducing the voltage applied to processor 110. Thus a method of reducing the amount of power consumed is enabled by the redirection of snoop operation to devices other than processor 110.

Figure 3A:
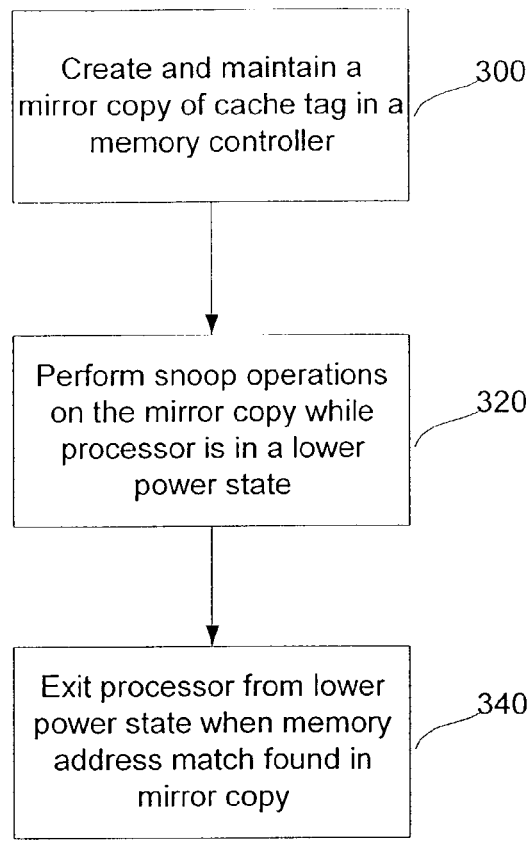
FIG. 3A illustrates a flow chart for a method of reducing snoop traffic on a processor bus.

Referring to FIG. 3A, a flow chart for a method of reducing snoop traffic on a processor bus is illustrated. In step 300, a mirror copy or an exact copy of cache tag is created and maintained in memory included in the memory controller. The minimum memory amount required is equal to the size of the tag RAM, which is simply a directory of the memory locations in the cache. The tag RAM size is typically smaller than the actual contents of the cache.

In one embodiment, a mirror copy of the cache tag, e.g., mirror tag 142, is created and maintained by writing the same cache tag information to the mirror copy location when it is written to the cache memory. In another embodiment, processor 110 may create the mirror copy of the cache tag by writing to mirror tag 142 just before processor 110 enters lower power state, e.g., C2 or C3.

In step 320, the snoop operations which are typically performed by processor 110 in C0 or C1 state are now performed by the memory controller 140. Some information handling system devices may be enabled to perform direct read/writes to main memory 150 without the involvement of processor 110. When an information handling system device enabled to directly access main memory 150 attempts to perform a read and/or write operation to main memory 150, memory controller 140 is configured to perform a snoop operation.

Performing the snoop operation may include performing functions such as comparing the memory address of the requested memory operation to the addresses stored in the mirror copy of the cache tag RAM to find a match. As described herein, the functions typically includes an operation being performed on one or more inputs to generate one or more outputs. Any circuit or system may be used to perform the function. In one embodiment, since the snoop operation is redirected from processor 110 to the memory controller 140, processor 110 is enabled to remain in the lower power state that typically does not support snooping.

In step 340, if the memory address of the requested memory access is found to match an entry, processor 110 may or may not be forced to exit the lower power state, depending on the status of the cache lines. If no match was found in mirror tag 142 then the snoop operation permits the direct access to main memory 150. Thus, memory access to lines that were not cached in processor 110 are enabled to directly access main memory 150 eliminating the need to wake up processor 110.

Figure 3B:
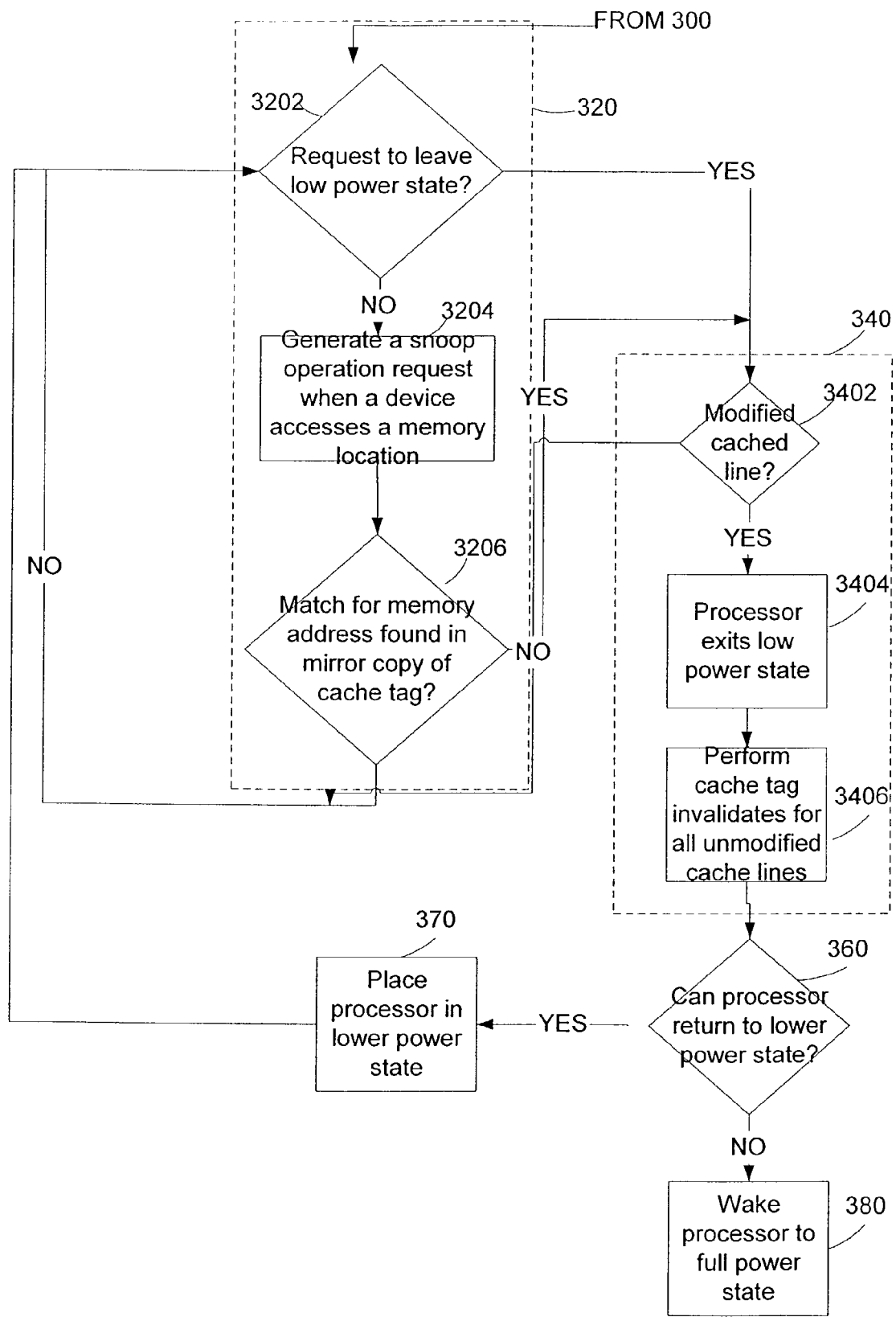
FIG. 3B illustrates a flow chart further detailing FIG. 3A, steps 320 and 340.

When a matching entry is found in the mirror copy of cache tag, then the step 340 may further include determining whether the cache line accessed represented a modified or an unmodified cache line, as described further detail in FIG. 3B. In one embodiment, a status bit in the cache tag is set up to indicate whether the cache line has been modified. In one embodiment, memory access to unmodified cache line is enabled to directly access the main memory 150 provided the cache line is invalidated upon processor 110 returning to the appropriate power state. Thus access to an unmodified cache line also eliminates the need to wake up processor 110, thereby reducing the power consumed by processor 110. By reducing the amount of time and the frequency of being woken up, processor 110 advantageously uses reduced power.

Access to a modified cache line would generally require that processor 110 be enabled to exit the lower power state. The write operation may only affect a portion of the cache line and would therefore need to be written back prior to the write cycle occurring in order to guarantee cache coherency. Read operations would generally require the processor to be woken up, e.g., by exiting lower power state, if the cache line has been modified relative to the value in system memory. If the value has not been modified, the sequence described above for write operations would apply. A read to an unmodified cache line may flow through to system memory. Invalidating may not be required for reads to unmodified cache lines.

Referring to FIG. 3B, a flow chart further detailing FIG. 3A, steps 320 and 340 is illustrated. Step 320 includes steps 3202, 3204 and 3206. As described earlier, after step 300, a mirror copy of the cache tag in the memory controller is created and maintained. In one embodiment, mirror tag 142 needs to be written/copied from processor 110 as the last task processor 110 performs prior to entering the lower power state. The memory controller typically cannot determine the status of the cache, and as a result the tag RAM, by watching the activity on the memory bus. The status of the cache lines may be altered by cycles that run only internal to the processor. Whenever permitted, processor 110 is placed in a lower power state to conserve power. Processor 110 continues to remain in a lower power state until it is woken up. In step 3202, it is determined if processor 110 has received a request to exit a lower power state. If processor 110 has been requested to be woken up, then program control is passed on to step 3402. If processor 110 has not been requested to be woken up then program control is passed on to step 3204.

In step 3204, an access to a main memory 150 location is configured to generate a request to perform a snoop operation. The access may be in the form of a read or a write operation to main memory 150. In one embodiment, memory controller 140 is enabled to detect an access to main memory 150 and automatically perform a snoop operation. In step 3206, memory controller 140 is enabled to check if the snoop operation has a hit, e.g., when the address of the memory location accessed has a match in the mirror copy, e.g., mirror tag 142, stored in memory controller 140. In one embodiment, an address comparator circuit is included with the memory controller to perform the comparison. If a match is found, e.g., when a snoop hit occurs, the program control is transferred to step 3402. If no match is found for the memory address location being accessed then processor 110 remains in the lower power state and program control is transferred to step 3202.

In step 3402, a determination is made whether the cache line is modified, e.g., determine if main memory 150 data is dirty. As described earlier, a status bit in the cache tag is set up to indicate whether the cache line has been modified. If it is determined the cache line is modified, e.g., when main memory 150 data is dirty, then the program control is transferred to step 3404. If the cache line has not been modified, i.e., is unmodified, then processor 110 remains in a lower power state, provided the cache line is invalidated upon the processor returning to the appropriate power state. In step 3404, processor 110 is enabled to exit the low power state since a snoop hit has occurred. In step 3406, processor 110 would get here if an access to a modified cache line has occurred. Processor 100 would write back the modified cache line or lines and return to the low power state. Invalidating the line may depend on the type of access that occurs.

In step 360, a determination is made if processor 110 is allowed to return to a lower power state. If it is allowed then processor 110 is placed in the lower power state in step 370, otherwise processor 110 is enabled to be placed in a power state that supports snooping of the cache, e.g., C0 or C1.

By maintaining a mirror copy of the cache tag in the memory of the memory controller and enabling the memory controller to perforin snoop operations, the method described in FIG. 3A and FIG. 3B may be advantageously used to reduce snoop traffic for processor 110, thereby reducing power consumed by processor 110.

Although the method and system of the present invention has been described in connection with the preferred embodiment, it is intended to cover such alternatives, modifications, and equivalents, as can be reasonably included within the spirit and scope of the invention as defined by the appended claims.

What is claimed is:

1. A method of reducing power consumed by a processor in an information handling system having the processor coupled to a memory controller, the method comprising the step of:
   providing a processor having a lower power state and a higher power state, wherein the processor is associated with a cache and a cache tag, and wherein the processor does not perform a snoop operation while in the lower power state; and
   performing the snoop operation with a memory controller, wherein the memory controller performs the snoop operation when the processor is in the lower power state, wherein the performance of the snoop operation with the memory controller comprises the steps of:
      maintaining a mirror of the cache tag in a memory controller, wherein the mirror cache tag is a directory of memory locations in the cache memory;
      updating the mirror cache tag of the memory controller when information is written to the cache so that the mirror cache tag has the same content as the cache tag of the processor; and
      performing a snoop operation on the mirror cache tag of the memory controller by determining if an address of a memory location has a match in the mirror cache tag of the memory controller.

2. The method of claim 1, wherein the lower power state is a C2 or C3 state.

3. The method of claim 1, wherein the higher power state is a C0 or C1 state.

4. The method of claim 1, wherein the snoop operation is generated when a device coupled to the information handling system performs a read or a write operation to a main memory location of the information handling system.

5. A method of reducing snoop traffic on a processor bus coupling a cache memory and a processor, wherein the cache memory is associated with a cache tag, the method comprising the steps of:
   maintaining a copy of the cache tag in a memory controller, wherein the cache tag and the cache tag copy are each directories of memory locations in the cache memory, wherein the memory controller is coupled to a processor bus, and wherein cache tag information is written to the cache tag copy in the memory controller when cache tag information is written to the cache memory;
   performing a snoop operation with the memory controller on the copy of the cache tag while the processor is in a lower power state, wherein the processor does not perform the snoop operation while operating in the lower power state; and
   changing the processor from the lower power state to the higher power state when an access to a modified cached line occurs.

6. The method of claim 5, wherein the step of maintaining the copy of the cache tag in the memory controller comprises the step of writing cache tag information to the tag copy included in the memory controller before the processor enters the lower power state.

7. The method of claim 5, wherein the step of performing the snoop operation further comprises the steps of:
  redirecting the snoop operation from the processor to the memory controller; and
  determining whether an address of a memory location accessed has a match in the cache tag copy stored in the memory controller.

8. The method of claim 5, wherein the step of reducing snoop traffic further comprises the step of maintaining the processor in the lower power state when an access to an unmodified cached line occurs.

9. The method of claim 5, wherein the snoop operation is generated when a device coupled to the information handling system performs a read or a write operation to a main memory location of the information handling system.

10. An information handling system, comprising:
  a processor, wherein the processor performs a snoop operation when in a higher power state and does not perform the snoop operation when in a lower power state;
  a memory coupled to the processor;
  a cache memory coupled to the processor and the memory and having a cache tag associated therewith;
  a processor bus, wherein the processor bus is coupled to the processor; and
  a memory controller coupled to the processor bus, wherein the memory controller is operable to perform the snoop operation while the processor is in the lower power state, wherein the memory controller performs the snoop operation by maintaining a copy of the cache tag and wherein the copy of the cache tag is maintained in the memory controller by writing cache tag information to the copy of the cache tag when cache tag information is written to the cache tag associated with the cache.

11. The system of claim 10, wherein the processor is maintained in the lower power state when an access to an unmodified cached line occurs.

12. The system of claim 10, wherein the snoop operation occurs when a device coupled to the information handling system performs a read or a write operation to the memory.

13. An information handling system comprising:
  a processor;
  a memory coupled to the processor;
  a cache memory coupled to a processor bus, wherein the processor bus is coupled to the processor and a memory controller;
  a cache tag associated with the cache memory; and
  wherein the memory controller is adapted to:
    store a copy of the cache tag in the memory controller, wherein the copy of the cache tag is stored in the memory controller by writing cache tag information to the copy of the cache tag in the memory controller when the cache tag information is written to the cache tag associated with the cache;
    perform a snoop operation with the memory controller on the copy of the cache tag when the processor is in a lower power state and thereby does not perform the snoop operation; and
    changing the processor from the lower power state to the higher power state when an access to a modified cached line occurs.

14. The system of claim 13, wherein the copy of cache tag is stored in the memory controller by the processor writing cache tag information to the memory controller before entering the lower power state.

15. The system of claim 13, wherein performing the snoop operation further comprises:
  redirecting the snoop operation from the processor to the memory controller; and
  determining whether an address of a memory location accessed has a match in the copy of the cache tag stored in the memory controller.

16. The system of claim 13, wherein the processor is maintained in the lower power state when an access to an unmodified cached line occurs.

17. The system of claim 13, wherein the snoop operation occurs when a device coupled to the information handling system performs a read or a write operation to the memory.

* * * * *